(12) United States Patent
Face, III et al.

(10) Patent No.: US 12,540,100 B2
(45) Date of Patent: Feb. 3, 2026

(54) CARBON-FOOTPRINT-REDUCED CONCRETE SLAB ON GROUND SYSTEM AND METHOD FOR CONSTRUCTING SAME

(71) Applicants: S. Allen Face, III, Sleepy Hollow, IL (US); Silvia Espenhain Face, Sleepy Hollow, IL (US)

(72) Inventors: S. Allen Face, III, Sleepy Hollow, IL (US); Silvia Espenhain Face, Sleepy Hollow, IL (US)

( * ) Notice: Subject to any disclaimer, the term of this patent is extended or adjusted under 35 U.S.C. 154(b) by 0 days.

(21) Appl. No.: 18/788,597

(22) Filed: Jul. 30, 2024

(65) Prior Publication Data

US 2025/0243115 A1    Jul. 31, 2025

Related U.S. Application Data

(62) Division of application No. 18/426,832, filed on Jan. 30, 2024.

(51) Int. Cl.
| | | |
|---|---|---|
| C04B 28/00 | (2006.01) | |
| C04B 28/04 | (2006.01) | |
| C04B 111/00 | (2006.01) | |

(52) U.S. Cl.
CPC ............ *C04B 28/006* (2013.01); *C04B 28/04* (2013.01); *C04B 2111/0075* (2013.01); *C04B 2290/00* (2013.01)

(58) Field of Classification Search
None
See application file for complete search history.

(56) References Cited

U.S. PATENT DOCUMENTS

2016/0332911 A1* 11/2016 Turpin, Jr. ............... C04B 28/02
2021/0198890 A1* 7/2021 Stehle ....................... E04C 2/06

* cited by examiner

*Primary Examiner* — Jeffrey D Washville
(74) *Attorney, Agent, or Firm* — Peter J. VanBergen

(57) ABSTRACT

A method of fabricating a concrete slab on ground system includes depositing wet geopolymer cement concrete on a ground substrate to generate a first slab. Wet Portland cement concrete is then deposited on the first slab to generate a second slab.

20 Claims, 4 Drawing Sheets

CARBON-FOOTPRINT-REDUCED CONCRETE SLAB ON GROUND SYSTEM AND METHOD FOR CONSTRUCTING SAME

This is a divisional application of co-pending application Ser. No. 18/426,832 "CARBON-FOOTPRINT-REDUCED CONCRETE SLAB ON GROUND SYSTEM AND METHOD FOR CONSTRUCTING SAME," filed on Jan. 30, 2024.

FIELD OF THE DISCLOSURE

This disclosure relates generally to concrete slabs on ground, and more particularly to methods and systems for a concrete slab on ground having a reduced carbon footprint.

BACKGROUND

Portland cement concrete is a standard construction material found in buildings and roads throughout the world. Unfortunately, the manufacture of Portland cement requires a great deal of heat that is typically generated by furnaces burning fossil fuels that, in turn, generate large quantities of carbon dioxide that are released into the Earth's atmosphere. As is well-known, carbon dioxide gets trapped in the Earth's atmosphere and serves as a contributor to global warming and climate change. Currently, it is estimated that the manufacture of one cubic yard of Portland cement concrete (i.e., about 3900 pounds) emits about 400 pounds of carbon dioxide into the atmosphere, and that the manufacture of Portland cement currently contributes about 7% of the world's total carbon dioxide emissions.

SUMMARY

Accordingly, it is an object of the present disclosure to describe methods and systems that reduce the need for Portland cement concrete in slabs on ground to thereby reduce carbon dioxide emissions associated with the manufacture of Portland cement.

Other objects and advantages of the methods and systems described herein will become more obvious hereinafter in the specification and drawings.

In accordance with methods and systems described herein, a method of fabricating a concrete slab on ground system is provided. Wet geopolymer cement concrete is deposited on a ground substrate to generate a first slab. Wet Portland cement concrete is then deposited on the first slab to generate a second slab.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein.

DETAILED DESCRIPTION

Figure 1:
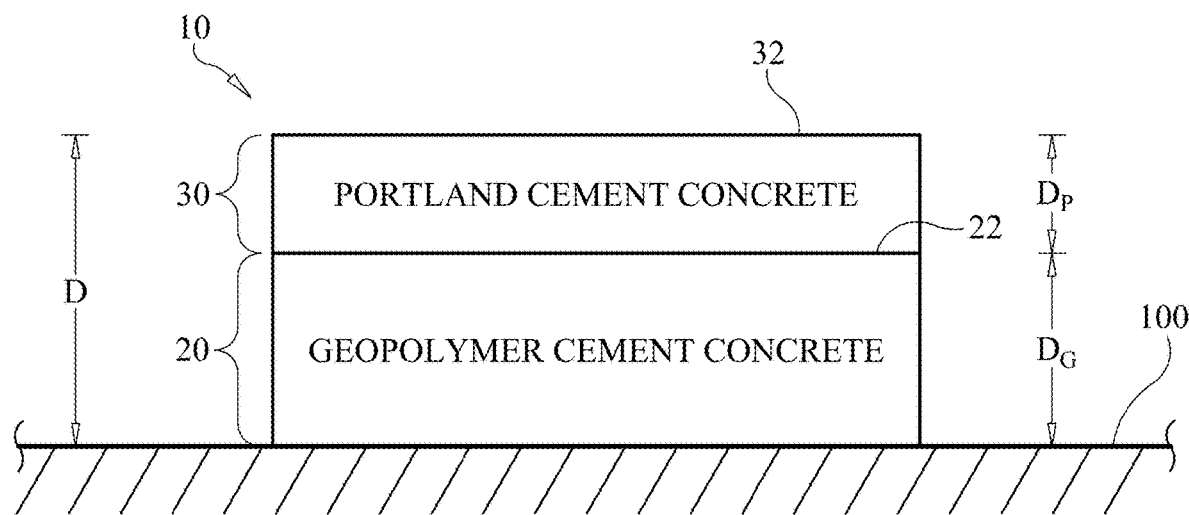
FIG. 1 illustrates an embodiment of a concrete slab on ground system in accordance with various aspects as described herein.

Referring now to the drawings and more particularly to FIG. 1, an embodiment of a concrete slab on ground system having a reduced carbon footprint in accordance with various aspects to be described herein is shown and is referenced generally by numeral 10. Concrete slab on ground system 10 may be used as part of a floor system on the interior of a building or as part of a variety of outside-environment walkways, roadways, parking lots, runways, etc.

Concrete slab on ground system 10 may be emplaced on a substrate 100 that may be a natural or prepared substrate depending on the particular application. The overall depth of concrete slab on ground system 10 is designated as "D". The actual amount for depth D will depend on the particular application but typically ranges from 4 inches to 12 inches. In the illustrated embodiment, the bottom portion of concrete slab on ground system 10 emplaced on the surface of substrate 100 is a geopolymer cement ("GC") concrete slab 20. The top portion of concrete slab on ground system 10 emplaced on the top surface 22 of GC concrete slab 20 is a conventional Portland cement ("PC") concrete slab 30. The top surface 32 of PC concrete slab 30 defines the surface of slab 30 that is to be the finished surface of concrete slab on ground system 10.

As used herein, the term Portland cement concrete (or PC concrete) used to construct PC concrete slab 30 may be any of a variety of Portland cement concrete formulations typically used to construct concrete floor slabs. Such formulations include, but are not limited to, concretes incorporating varying amounts of various natural and/or artificial pozzolans such as one or more of fly ash, GGBFS (ground granulated blast furnace slag), silica fume, varying amounts of ordinary Portland cement concrete dry and liquid additives such as one or more of water reducers, superplasticizers, air entrainers, pumping agents, set retarders, set accelerators, alkali-silica reactivity inhibitors, defoamers, strength enhancers, shrinkage reducing admixtures, expanding agents, curing agents, colorants, bondbreakers, anti-corrosion admixtures, etc.

In general, the depth "$D_G$" of GC concrete slab 20 is greater than the depth "$D_P$" of PC concrete slab 30. That is, the depth $D_G$ of GC concrete slab 20 is greater than half of the overall depth D of concrete slab on ground system 10 or $D_G \geq D/2$. Thus, when compared to a conventional Portland cement-based concrete slab on ground made completely from Portland cement concrete and having the same overall depth D, concrete slab on ground system 10 reduces the amount of Portland cement concrete by at least 50% leading to a reduced-carbon-footprint concrete slab on ground.

GC concrete slab 20 includes a geopolymer cement mixed with sand and rocks as is understood in the art. In some embodiments, the geopolymer cement used in GC concrete slab 20 may include waste products that may be environmentally hazardous such as fly ash. A fly ash component of GC concrete slab 20 may either be "low-carbon" fly ash having a "loss on ignition" (LOI) of not more than 6%, or a "high carbon" fly ash having a "loss on ignition" (LOI) of greater than 6%. In general, fly ash is readily available as huge stockpiles thereof have been created over the years as fly ash is a by-product of coal-fired electric plants. The use of "high carbon" fly ash in GC concrete slab 20 may be particularly beneficial from a financial perspective given its ready availability and relative low cost in light of "high carbon" fly ash's deleterious effect upon the strength of Portland cement concrete renders it generally unsuitable for use in building constructions.

In some embodiments, the geopolymer cement used in GC concrete slab 20 may be made without using any fly ash. For example, some geopolymer cements may be made using one or more of "ground granulated blast furnace slag" (GGBFS), metakaolin, or ground-up glass. In some embodiments, fly ash may be mixed with one or more of non-fly ash materials. In general, the term GC concrete as used herein for the construction of GC concrete slab 30 may be any of a variety of geopolymer concrete formulations including, but not limited to, geopolymer concretes incorporating varying amounts of various natural and/or artificial pozzolans such as one or more of aluminosilicates, fly ash, GGBFS (ground granulated blast furnace slag), clay, marl, varying amounts of alkaline liquid activators containing alkali metal bases, alkali silicates, varying amounts of geopolymer concrete dry and liquid additives such as one or more of water reducers, superplasticizers, air entrainers, pumping agents, set retarders, set accelerators, alkali-silica reactivity inhibitors, defoamers, strength enhancers, shrinkage reducing admixtures, expanding agents, curing agents, colorants, bondbreakers, anti-corrosion admixtures, etc. Accordingly, it is to be understood that the methods and systems described herein may utilize a variety of geopolymer cement and concrete formulations without departing from the scope of the present disclosure.

While geopolymer cement avoids the carbon footprint issues associated with the manufacture of Portland cement, all geopolymer cement concretes must incorporate large volumes of liquid silicates and liquid hydroxides. Because these industrial chemicals are not employed in the production of conventional Portland cement concretes, the special requirements that attend their use generally render existing facilities and equipment used for the production and delivery of conventional Portland cement concretes unfit for the production/delivery of geopolymer cement concretes. Consequently, notwithstanding the significant benefit in reduced carbon emissions to be obtained through the use of geopolymer cement concretes, the huge cost of modifying or augmenting the existing Portland cement concrete infrastructure to accommodate the production and delivery of geopolymer cement concretes has remained a major impediment to their widespread use.

The liquid hydroxides used in geopolymer cement concrete also present two problems in the art of concrete slab construction and finishing. First, since concrete slab finishing requires hands-on manual labor, the liquefied hydroxide in the wet geopolymer cement concrete can cause severe skin burns and eye damage. Second, the world's concrete slab finishing work force only has experience working with water-based Portland cement concrete, and the Portland cement concrete skills and methods are much different from (and even antithetical to) the skills and methods required to finish geopolymer cement concrete. Accordingly, in order to avoid risk, sustain quality, and protect profit, developers and construction firms generally shy away from employing geopolymer cement concrete technologies when constructing slabs on ground.

The methods and systems described herein avoid the above-described problems by making the lower portion of concrete slab on ground system 10 an unfinished GC concrete slab 20, while making the upper portion of concrete slab on ground system 10 a conventionally-finished PC concrete slab 30. The geopolymer concrete used to construct the lower GC concrete slab 20 portion of concrete slab on ground system 10 is manufactured on site in a manner that requires no changes to be made in any of the facilities or equipment used to produce and deliver conventional Portland cement concrete. Furthermore, since the installation of GC concrete slab 20 may be accomplished using only mechanical emplacement equipment operable by personnel located at safe distances from any toxic or hazardous geopolymer constituents and since the top surface 22 of GC concrete slab 20 need not be finished, the use of GC concrete does not present a hazard either to worker health or to the business interests of the project's principals. On the contrary, the potential for a project's principal to reap the benefits of "carbon credits" through the above-described safe use of geopolymer cement concrete will provide more than enough incentive for the system's application. In addition, the carbon credits may be considered to be enhanced or "super" carbon credits since existing/useless stores of environmentally-hazardous and/or toxic fly ash and/or other waste materials may be reduced as they are simultaneously safely embedded within a concrete slab thereby nullifying their toxicity. Still further, by topping concrete slab on ground system 10 with PC concrete slab 30 whose top surface 32 may be finished safely and in accordance with well-accepted and well-understood finishing procedures, all of the problems normally associated with the installation of geopolymer concrete slabs are avoided.

Figure 2A:
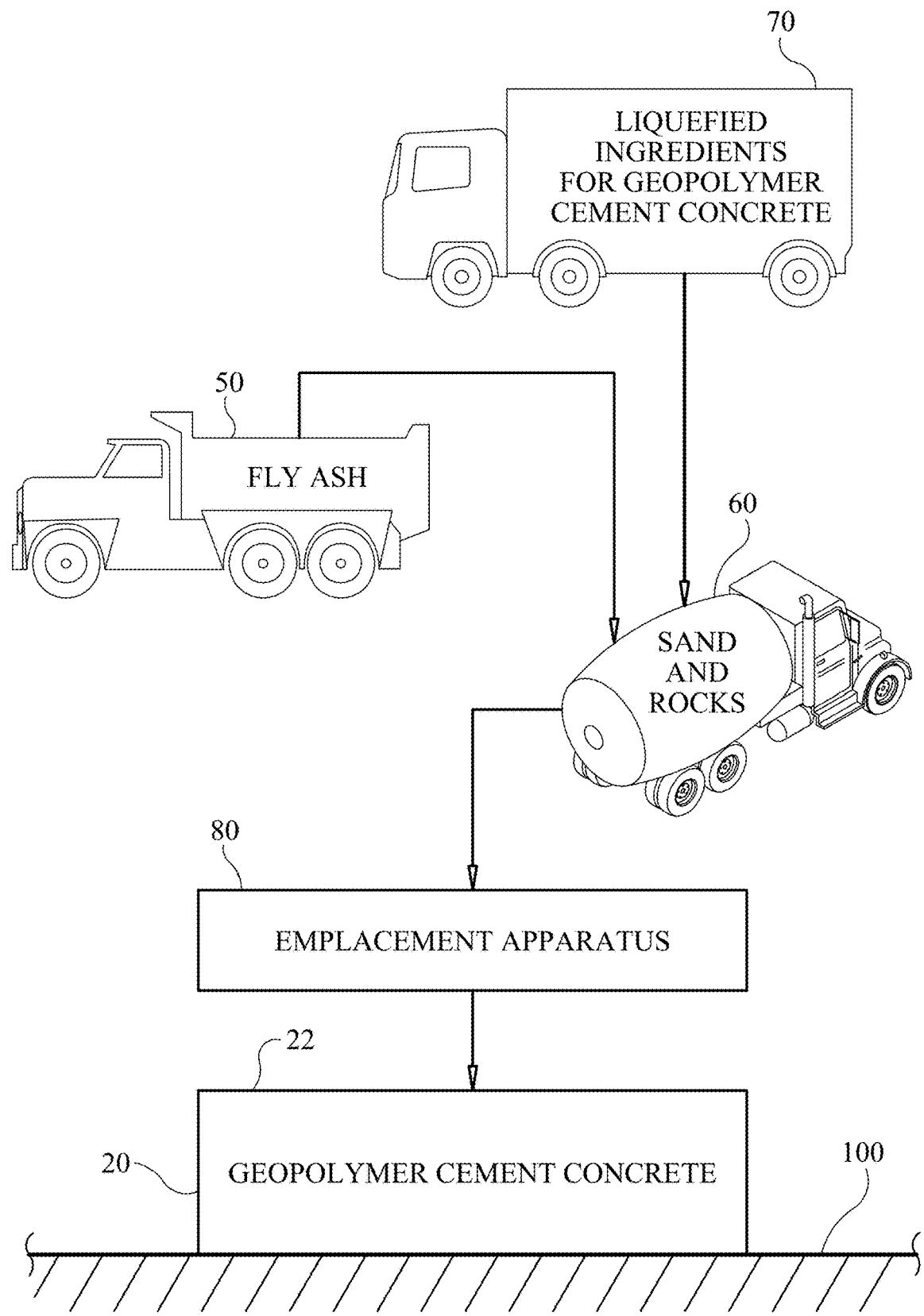
FIG. 2A illustrates one embodiment of a first part of an emplacement method scenario for fabricating the concrete slab on ground system illustrated in FIG. 1 in accordance with various aspects as described herein.
Figure 2B:
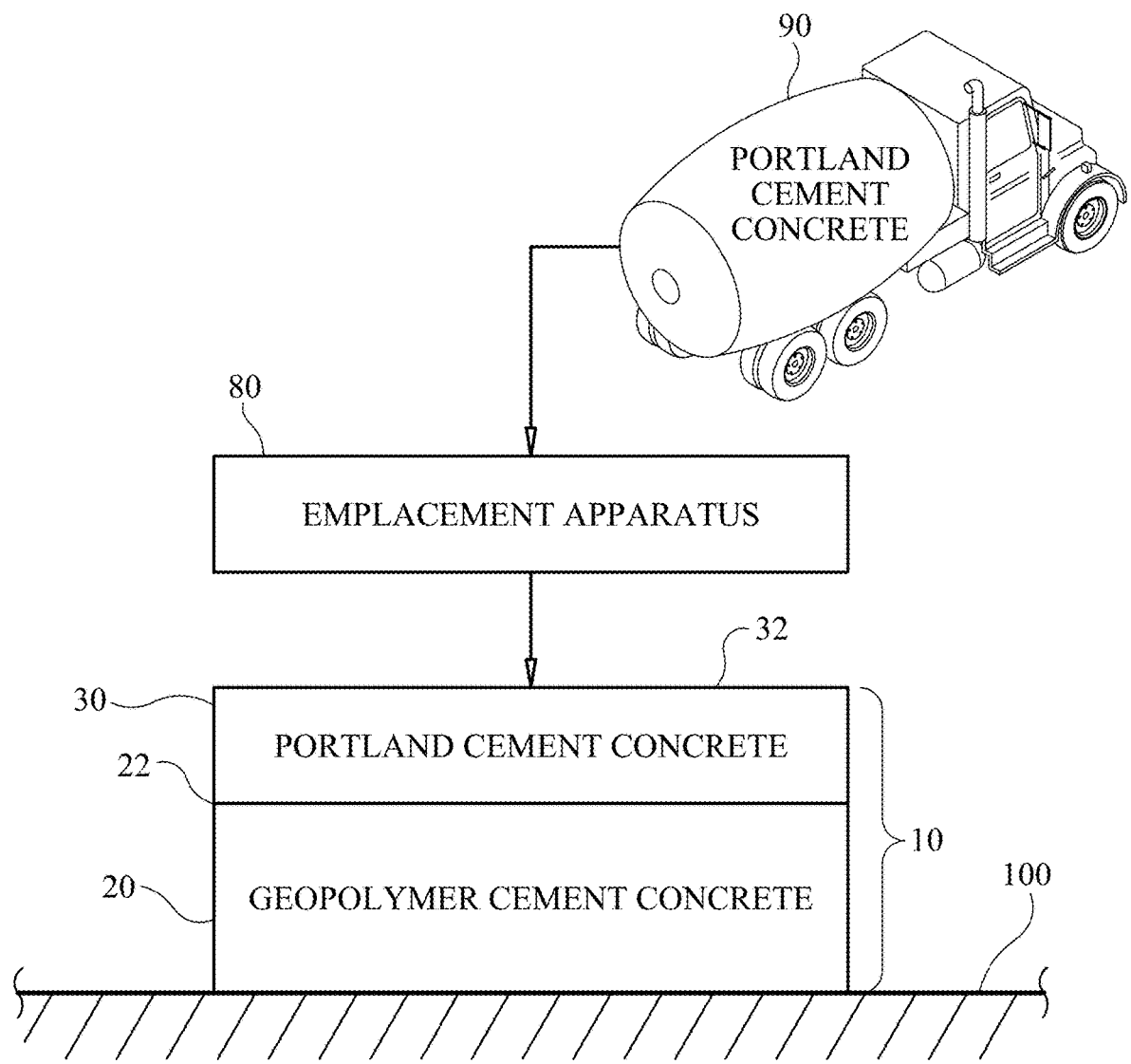
FIG. 2B illustrates one embodiment of a second part of an emplacement method scenario for fabricating the concrete slab on ground system illustrated in FIG. 1 in accordance with various aspects as described herein.

Referring now to FIGS. 2A and 2B, an embodiment of a two-part emplacement method scenario for concrete slab on ground system 10 is illustrated. More specifically, FIG. 2A illustrates an embodiment of a first part of an emplacement method scenario, and FIG. 2B illustrates an embodiment of a second part of an emplacement method scenario. The site or location of substrate 100 where the concrete slab on ground system will be emplaced may reside in an inside environment or an outside environment without departing from the scope of the instant disclosure.

Referring first to FIG. 2A, the site of substrate 100 also serves as the fabrication location for the wet or plastic geopolymer cement concrete that will be emplaced on substrate 100 to ultimately become GC concrete slab 20. In the illustrated example, the ingredients for GC concrete slab 20 are provided in three different types of vehicles. For example, in the illustrated embodiment, one or more conventional hauling or dump truck 50 may be used to transport fly ash to a position near or adjacent to substrate 100. As mentioned above, dump truck 50 may also be used to transport additional and/or other non-fly ash waste materials that are to be incorporated into the geopolymer cement. One or more conventional concrete mixer truck 60 may be used to transport/maneuver a mixture of sand and rocks (i.e., in type, size, and quantity for a typical load of geopolymer cement concrete that would normally be transported by mixer truck 60) to a position near or adjacent to substrate 100. One or more conventional tanker or pumper truck 70 may be used to transport/maneuver the liquefied ingredients (e.g., liquid silicates, liquid hydroxides, etc.) needed to make geopolymer cement concrete to a position near or adjacent to substrate 100. Trucks 50 and 70 may be driver-driven vehicles or otherwise maneuverable vehicles to include autonomous or self-drive vehicles, vehicles directed along tracks, etc., without departing from the scope of the present disclosure.

When trucks 50, 60, and 70 are present, requisite amounts of material(s) from truck 50 and liquefied ingredients from truck 70 are transferred or added to mixer truck 60 in amounts needed to generate a load of wet geopolymer cement concrete in mixer truck 60. Once the proper mixture is attained or is being attained, mixer truck 60 may be operated to mix the combined ingredients into a wet geopolymer cement concrete. When fully mixed, the wet geopolymer cement concrete may be deposited onto substrate 100 via mechanized deposition. For example, the wet geopolymer cement concrete may be deposited onto substrate 100 directly from truck 60 or via an intermediate emplacement apparatus 80 supplied with the wet geopolymer cement concrete. In either case, the wet geopolymer cement concrete is emplaced on substrate 100 in sufficient quantity to ultimately form GC concrete slab 20. Following the mechanical deposition of geopolymer cement concrete upon substrate 100, completion of the construction of GC concrete slab 20 only requires that its upper surface 22 be struck off to its desired elevation. In this case, the strike-off may be accomplished solely by mechanical means using equipment well known in the art. No finishing of any kind is required for the top surface 22 of GC concrete slab 20. The character of top surface 22 left by its mechanical strike-off is sufficient for all its future uses as part of concrete slab on ground system 10.

Fabrication of PC concrete slab 30 may proceed any time after GC concrete slab 20 is in place. That is, fabrication of PC concrete slab 30 may begin immediately, or hours, or days, or months, or years, after GC concrete slab 20 has been struck-off mechanically to create its top surface 22. As illustrated, for example, in FIG. 2B, one or more conventional mixer truck 90 may be used to transport wet/mixed Portland cement concrete to a position near or adjacent to GC concrete slab 20. The wet/mixed Portland cement concrete, for example, may be deposited either directly upon GC concrete slab 20, or via an intermediate emplacement apparatus 80 that emplaces the wet Portland cement concrete on GC concrete slab 20 to ultimately form PC concrete slab 30 whose top surface 32 may be finished safely and conventionally to yield concrete slab on ground system 10. In general, the thickness of PC concrete slab 30 will be at least one inch to accommodate conventional slab finishing operations.

Figure 3:
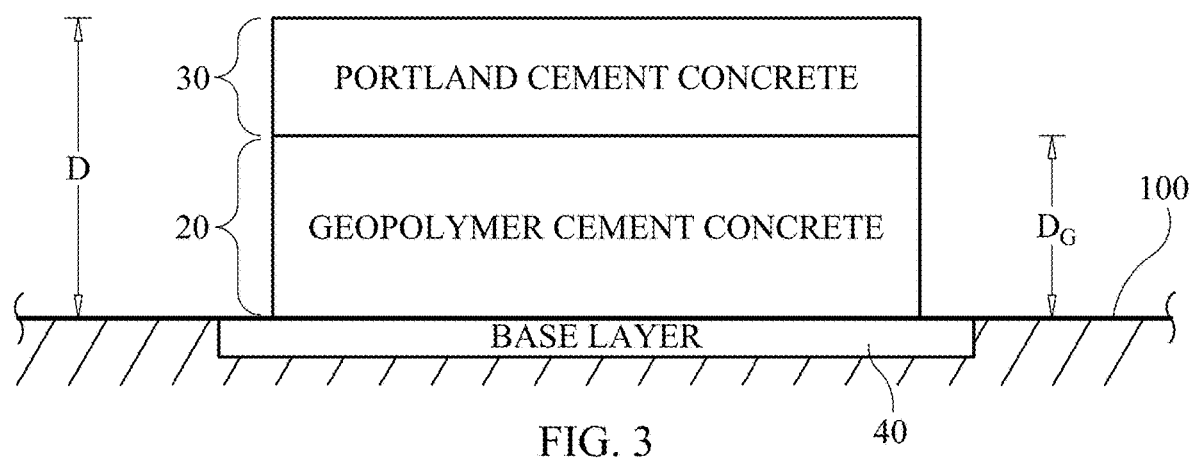
FIG. 3 illustrates another embodiment of a concrete slab on ground system having an additional layer between the underlying substrate and the geopolymer cement concrete slab in accordance with various aspects as described herein.

In some embodiments, a slab on ground system in accordance with the present disclosure may be fabricated on top of one or more existing materials on a ground surface or substrate. For example, FIG. 3 illustrates substrate 100 as inclusive of a base layer 40 on which GC concrete slab 20 will be deposited. Base layer 40 may be a variety of different and existing materials that may be left in place to receive deposition of GC concrete slab 20. In some embodiments, base layer 40 may be a layer of lime-stabilized soil in the case where substrate 100 is wet soil. In some embodiments, base layer 40 may be asphaltic concrete typically used in the construction of open-air parking lots. In some embodiments, base layer 40 may be some type of roller-compacted concrete typically used in truck-to-railcar transfer stations.

Figure 4:
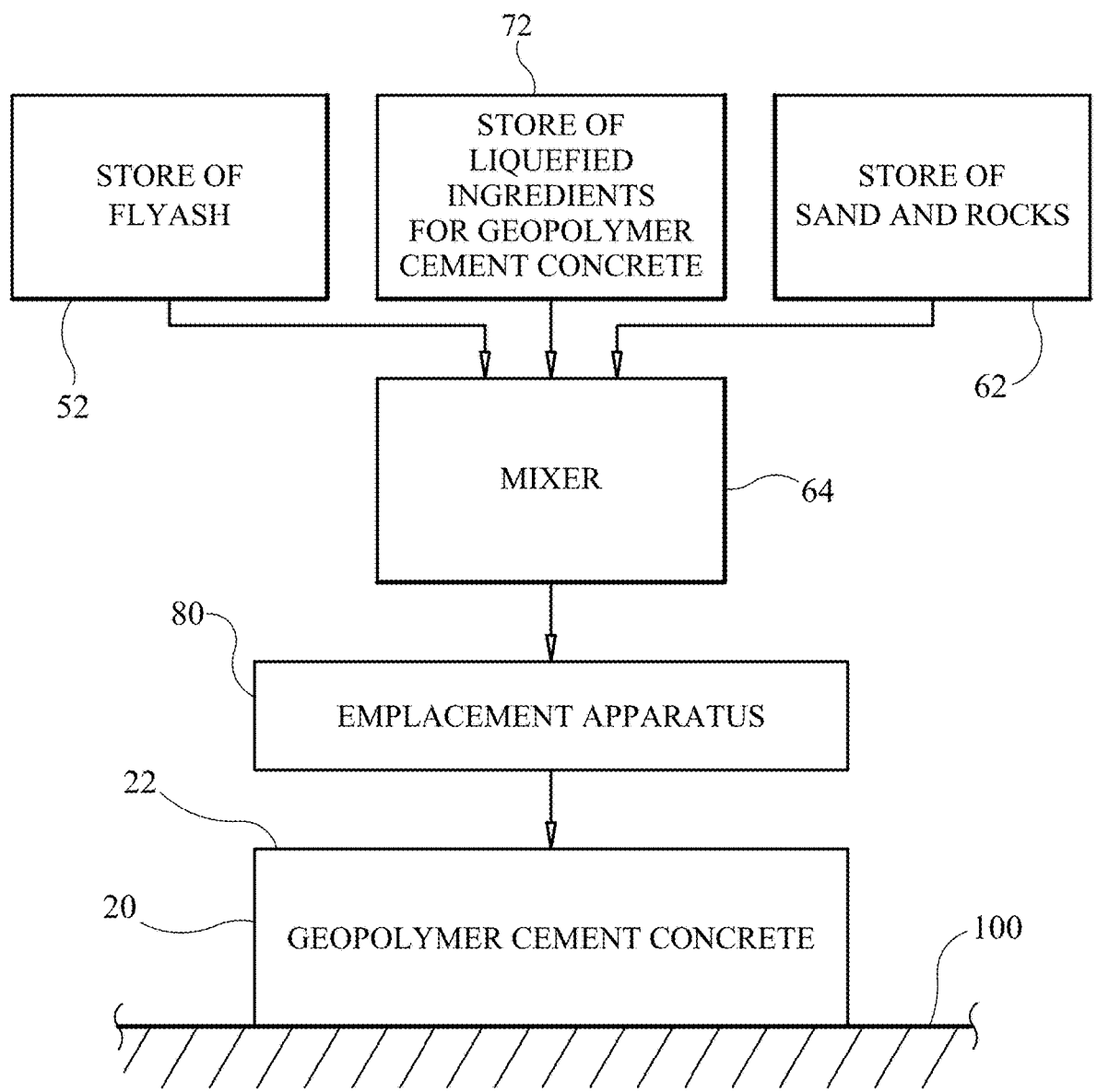
FIG. 4 illustrates another embodiment of the first part of an emplacement method scenario for fabricating the concrete slab on ground system in accordance with various aspects as described herein.

In some embodiments, rather than transport relatively small loads of materials to a site, it may be more efficient to stock a number of larger-size material stores at a site where an above-described concrete slab on ground is to be fabricated. For example and as illustrated in FIG. 4, another embodiment of the first part of a two-part emplacement method scenario utilizes such material stores at or adjacent to the site where substrate 100 is located. More specifically, a store 52 of fly ash (and/or one or more of the other constituents described herein), a store 72 of liquefied ingredients for geopolymer cement concrete, and a store 62 of sand and rocks may be provided. The requisite amounts or quantities of materials from stores 52, 62, and 72 are supplied to a mixer 64 (e.g., conventional concrete mixer trucks) for generation of a wet geopolymer cement concrete that may be provided to an emplacement apparatus 80 or directly onto substrate 100 to form GC concrete slab 20 as described previously herein. The second part of the emplacement method scenario may proceed as described previously herein.

The advantages of the herein-described methods and systems are numerous. The concrete slab on ground system uses a minimum of 50% less Portland cement concrete as compared to conventional slabs on ground made from 100% Portland cement concrete. The large reduction in Portland cement concrete greatly reduces the amount of Portland cement used and, therefore, the amount of carbon dioxide emitted into the atmosphere during the manufacture of Portland cement. The bulk underlayment of a geopolymer cement concrete slab may be readily fabricated on-site using existing and readily available facilities and equipment thereby avoiding the need for any significant changes away from the current Portland cement concrete oriented infrastructure. The bulk underlayment of a geopolymer cement concrete slab may be readily fabricated on-site using readily available waste products such as fly ash. When the fly ash used is of the "high carbon" variety, multiple savings are realized, since this waste material currently has very little technical use or commercial value. Since the finished surface of the concrete slab on ground system is made from water-based Portland cement concrete, all finishing operations are safe and well-understood such that slab fabrication remains safe and profitable.

Although the methods and systems presented herein have been described for specific embodiments thereof, there are numerous variations and modifications that will be readily apparent to those skilled in the art in light of the above teachings. It is therefore to be understood that, within the scope of the appended claims, the methods and systems presented herein may be practiced other than as specifically described.

What is claimed as new and desired to be secured by Letters Patent of the United States is:

1. A method of fabricating a concrete slab on ground system, comprising:
   by a set of transport vehicles including
   a first transport vehicle operable to transport materials selected from the group consisting of fly ash, ground granulated blast furnace slag, metakaolin, ground glass, and mixtures thereof,
   a second transport vehicle operable to transport liquid ingredients of a geopolymer cement concrete, and
   a third transport vehicle operable to transport sand and rocks, and
   by a concrete mixing vehicle operable to transport wet Portland cement concrete in the concrete mixing vehicle,
   maneuvering the set of transport vehicles to a site having a ground substrate;
   transferring a quantity of the materials and a quantity of the liquid ingredients to the third transport vehicle;

mixing, in the third transport vehicle, the quantity of the materials, the quantity of the liquid ingredients, and the sand and rocks to generate a wet geopolymer cement concrete;

depositing the wet geopolymer cement concrete on the ground substrate to generate a first slab;

maneuvering the concrete mixing vehicle to the site; and depositing the wet Portland cement concrete on the first slab to generate a second slab.

2. The method of claim 1, wherein the first slab and second slab have a combined depth D, and wherein a depth $D_1$ of the first slab is at least 50% of the combined depth D.

3. The method of claim 1, wherein the second slab is deposited to a depth of at least one inch.

4. The method of claim 1, further comprising finishing a surface of the second slab that is exposed to an environment.

5. A method of fabricating a concrete slab on ground system, comprising:

by a set of stores located at a site having a ground substrate, said set of stores including a first store of materials selected from the group consisting of fly ash, ground granulated blast furnace slag, metakaolin, ground glass, and mixtures thereof, a second store of liquid ingredients of a geopolymer cement concrete, and a third store of sand and rocks, and by a concrete mixing vehicle operable to transport wet Portland cement concrete in the concrete mixing vehicle, mixing, at the site, quantities of the materials, the liquid ingredients, and the sand and rocks to generate a wet geopolymer cement concrete;

depositing the wet geopolymer cement concrete on the ground substrate to generate a first slab;

maneuvering the concrete mixing vehicle to the site; and depositing the wet Portland cement concrete on the first slab to generate a second slab.

6. The method of claim 5, wherein the second slab is deposited to a depth of at least one inch.

7. The method of claim 6, further comprising finishing a surface of the second slab that is exposed to an environment.

8. The method of claim 6, wherein the first slab and the second slab have a combined depth D, and wherein a depth $D_1$ of the first slab is at least 50% of the combined depth D.

9. A method of fabricating a concrete slab on ground system, comprising:

providing, at a site having a ground substrate, materials selected from the group consisting of fly ash, ground granulated blast furnace slag, metakaolin, ground glass, and mixtures thereof, liquid ingredients of a geopolymer cement concrete, and sand and rocks;

mixing, at the site, quantities of the materials, the liquid ingredients, and the sand and rocks to generate a wet geopolymer cement concrete;

depositing the wet geopolymer cement concrete on the ground substrate to generate a first slab;

providing, at the site, wet Portland cement concrete; and depositing the wet Portland cement concrete on the first slab to generate a second slab.

10. The method of claim 9, wherein the second slab is deposited to a depth of at least one inch.

11. The method of claim 9, further comprising finishing a surface of the second slab that is exposed to an environment.

12. The method of claim 9, wherein the first slab and the second slab have a combined depth D, and wherein a depth $D_1$ of the first slab is at least 50% of the combined depth D.

13. A method of fabricating a concrete slab on ground system, comprising:

depositing wet geopolymer cement concrete on a ground substrate to generate a first slab; and depositing wet Portland cement concrete on the first slab to generate a second slab.

14. The method of claim 13, wherein the second slab is deposited to a depth of at least one inch.

15. The method of claim 13, further comprising finishing a surface of the second slab that is exposed to an environment.

16. The method of claim 13, wherein the first slab and the second slab have a combined depth D, and wherein a depth $D_1$ of the first slab is at least 50% of the combined depth D.

17. A method of fabricating a concrete slab on ground system, comprising:

depositing a first slab on a ground substrate, the first slab consisting of geopolymer cement; and depositing a second slab on the first slab, the second slab consisting of Portland cement concrete.

18. The method of claim 17, wherein the second slab is deposited to a depth of at least one inch.

19. The method of claim 17, further comprising finishing a surface of the second slab that is exposed to an environment.

20. The method of claim 17, wherein the first slab and the second slab have a combined depth D, and wherein a depth $D_1$ of the first slab is at least 50% of the combined depth D.

\* \* \* \* \*